United States Patent Office 2,879,259
Patented Mar. 24, 1959

2,879,259

PROCESS FOR MANUFACTURE OF GLYCIDYL ETHERS OF POLYHYDRIC PHENOLS

Roy W. H. Tess, Orinda, Calif., assignor to Shell Development Company, New York, N.Y., a corporation of Delaware No Drawing. Application May 23, 1955
Serial No. 510,520

12 Claims. (Cl. 260—47)

This invention relates to the manufacture of glycidyl ethers of polyhydric phenols, and more particularly to a new process for manufacture of glycidyl ethers of polyhydric phenols which provides better phase separation when solvents are present during purification of the ethers.

Specifically, the invention provides a new process for preparing glycidyl ethers of polyhydric phenols which provides better separation of aqueous and organic phases when solvents are present during the working up of the ether to remove the salt formed during the reaction. This process comprises effecting the etherification of the polyhydric phenol with epihalohydrin in conjunction with the alkali metal hydroxide in the presence of a small amount of an additive comprising an alkali metal salt of an inorganic acid the anion portion of which contains oxygen and a member of the group consisting of sulfur and phosphorus, such as, for example, sodium hydrosulfite, the presence of which additive surprisingly improves the subsequent separation of the organic and aqueous phases during the purification step.

Glycidyl ethers of polyhydric phenols, commonly known as epoxy resins, are prepared by etherifying a polyhydric phenol with epichlorohydrin in conjunction with aqueous sodium hydroxide to effect the reaction. Sodium chloride is formed as a by-product in the reaction and must be removed before the glycidyl ethers can be used in their intended applications. The most efficient methods used for removing the salt involve the use of solvents which may be added during the preparation of the ethers or during the purification. When solvents are utilized, the resin is taken up in the solvent but the salt is not, and any salt remaining in the resin solution can then be removed by repeated water washing of the organic phase. The use of solvents in the preparation or purification of the glycidyl ethers, however, is not particularly desirable because of a phase separation problem. In most cases, the solvent causes some emulsification of the resin and this causes a long and incomplete separation of the aqueous and organic phases. Such long and inefficient separation cannot be tolerated for large scale commercial operations.

It is an object of the invention, therefore, to provide a new method for manufacture of glycidyl ethers of polyhydric phenols. It is a further object to provide a new method for manufacture of glycidyl ethers of polyhydric phenols which provides improved phase separation when using solvents for salt removal. It is a further object to provide a new method for manufacture of glycidyl ethers of polyhydric phenols which provides excellent phase separation when solvents are used during purification of the resin. It is a further object to provide a new method for manufacture of glycidyl ethers of polyhydric phenols which provides better phase separation when using solvents during the preparation of the resin. It is a further object to provide a new method for preparing glycidyl ethers of polyhydric phenols which yields products which are of lighter color and more color stable than those prepared by the conventional methods. These and other objects of the invention will be apparent from the following detailed description thereof.

It has now been discovered that these and other objects may be accomplished by the process of the invention which comprises effecting the etherification of the polyhydric phenol with epihalohydrin in conjunction with the alkali metal hydroxide in the presence of a small amount of an alkali metal salt of an inorganic acid the anion portion of which contains oxygen and a member of the group consisting of sulfur and phosphorus, such as, for example, sodium hydrosulfite. It has been found that when this special type of salt is included in the reaction mixture, there is a surprisingly great improvement in the separation of the aqueous and organic phase both as to shortness of time and to completeness of the separation. This unexpected improvement is obtained both when the solvent is included in the preparation of the resin as well as when the solvent is utilized in working up the already formed resin.

It has also been found that the addition of the special type of salt described above causes formation of resins which are of much lighter color than those prepared by the conventional methods and in addition are more light stable, i. e. have less tendency to yellow or discolor on extended exposure. This is of considerable advantage in that it permits the use of the glycidyl ethers to applications, such as preparation of white enamels, where the previously formed darker colored resins were not ideally suited.

The special additives used in the process of the invention comprise the alkali metal salts of inorganic acids the anion portion of which contain oxygen and a member of the group consisting of sulfur and phosphorous. Examples of these additives include, among others, sodium and potassium hydrosulfite, sodium and potassium hypophosphite and sodium and potassium thiosulfate. Sodium hydrosulfite is the more preferred additive.

The special additive is added in only small amounts and preferably in amounts not larger than 2% by weight based on the weight of the polyhydric phenol. The hydrosulfites are preferably employed in amounts of not more than 0.3% by weight.

In the operation of the process of the invention, one or more of the above described special additives are added to the reaction mixture containing the polyhydric phenol, epihalohydrin and alkali metal hydroxide and the mixture heated in the conventional manner. Any polyhydric phenol may be used in the process. Typical examples include, among others, resorcinol, hydroquinone, methyl resorcinol, chlorohydroquinone, phloroglucinol 1,5-dihydroxynaphthalene, 4,4'-dihydroxydiphenol, bis(4-hydroxyphenyl)methane, 1,1 - bis(4 - hydroxyphenyl) ethane, 1,1-bis(4-hydroxyphenyl)isobutane, 2,2-bis(4-hydroxyphenol)propane which is termed bis-phenol hereinafter for convenience, 2,2 - bis(4 - hydroxyphenyl)butane, 2,2-bis(4-hydroxy-2-methylphenyl)propane, 2,2-bis(2-hydroxy-4-tertiary-butylphenyl)propane, 2,2-bis(2-hydroxyphenyl)propane, 2,4'-dihydroxydiphenyldimethylmethane, 2,2-bis(2-chloro-4-hydroxyphenyl)propane, 2,2-bis(2-hydroxynaphthyl)pentane, 2,2 - bis(2,5 - dibromo - 4 - hydroxyphenyl)butane, 4,4'-dihydroxybenzophenone, 1,3-bis (4 - hydroxyphenyloxy) - 2 - hydroxypropane, 3-hydroxyphenyl salicylate, 4-salicoylaminophenol, as well as more complex polyhydric phenols such as novolac resins obtainable by acid catalyzed condensation of phenol, p-cresol or other substituted phenols with aldehydes such as formaldehyde, acetaldehyde, crotonaldehyde, etc.; condensates of phenols with cardanol such as described in U.S. Patent 2,317,607; condensates of phenols with aliphatic diols such as described in U.S. Patent 2,321,620; and condensates of phenols with unsaturated fatty oils such as described in U.S. Patent 2,031,586. The polyhydric phenols contain 2 or more phenolic hydroxyl groups in the average molecule thereof and are free of other functional groups which would interfere with formation of the desired glycidyl ethers.

Although it is preferred to use epichlorohydrin, other epihalohydrins, such as epibromohydrin, may also be used if desired. Sodium hydroxide is normally preferred as the alkali metal hydroxide, but other hydroxides such as potassium hydroxide may be employed.

As to proportions, more than an equivalent of the epihalohydrin must be used in order that the product will be a glycidyl ether. By this is meant that more than 0.5 mole of epihalohydrin per phenolic hydroxyl equivalent weight of the phenol is used. Thus when a dihydric phenol is etherified according to the process, more than 1 mole of epihalohydrin per mole of the phenol is used. Generally, there are used about 1.05 to 2 moles of epihalohydrin per mole of dihydric phenol to prepare the higher epoxy resins. As is known, these resins contain a chain of divalent aromatic radicals from the dihydric phenol, and aliphatic radicals from the epihalohydrin, with these two types of radicals alternating and being joined by ethereal oxygen atoms. The terminal groups of the polyethers are primarily glycidyl radicals. The length of the chain and the molecular weight is controlled by the proportion of halohydrin to phenol. As the mole ratio of epihalohydrin to phenol is decreased down from about two towards one, the length of the chain and the molecular weight increases. When it is desired to produce glycidyl ethers of lowest molecular weight from dihydric phenols or phenols containing three or more hydroxyl groups, it is preferred to use a substantial excess of epihalohydrin such as more than 2 moles per phenolic hydroxyl equivalent weight of the phenol. Although the excess may vary widely, good results are obtained using about 5 to 10 moles of epihalohydrin per phenolic hydroxyl equivalent weight of the phenol. Thus, in preparing glycidyl ether having low molecular weight from a dihydric phenol, a ratio of about 5 to 25 moles, preferably about 10 to 20 moles of epihalohydrin per mole of the dihydric phenol is used.

The amount of hydroxide used in the process is largely governed by the amount of epihalohydrin that reacts. Thus in etherifying a polyhyric phenol with use of an excess of more than two moles of epihalohydrin per phenolic hydroxyl equivalent weight of the phenol, there is used about a mole of the hydroxide per phenolic hydroxyl equivalent weight of the phenol. For example, preparation of glycidyl ether of a dihydric phenol with use of the excess of epihalohydrin is normally effected with use of about 1.8 to 2.5 moles, preferably about 2.1 to 2.3 moles, of the hydroxide per mole of the dihydric phenol. In reacting about 1.05 to 2 moles of epihalohydrin with a mole of dihydric phenol so as to form the higher epoxy resins, the hydroxide is used in amount of about 2 to 30% excess over the stoichiometric equivalent of the epihalohydrin, a mole of the hydroxide being considered as the stoichiometric equivalent of a mole of the epihalohydrin.

The alkali metal hydroxide may be brought together with the other reactants in any suitable manner. While solid hydroxide may be used it is usually preferred to employ an aqueous solution such as one containing about 5% to 30% by weight of the hydroxide. Good results are obtained using about 10% to 20% by weight concentration of aqueous hydroxide solution. If desired, a solution or suspension of the hydroxide may also be used.

Temperatures used in the etherification reaction generally vary between about 40° C. to about 150° C. and more preferably between 60° C. to 100° C. It is usually desirable to maintain the mixture at gentle reflux temperature. The reaction is preferably conducted at atmospheric pressure but if temperatures above normal boiling temperatures are required, superatmospheric pressures should be employed in order to maintain the liquid phase.

Although various procedures may be employed in bringing the reactants together, it is generally preferred to add the polyhydric phenol to the aqueous solution containing the alkali metal hydroxide and the special additive, warm the mixture and then add the epihalohydrin to the mixture. In preparing the solid glycidyl ether of bis-phenol using epichlorohydrin, sodium hydroxide, and sodium hydrosulfite as the additive, for example one may add solid sodium hydroxide and sodium hydrosulfite to the necessary amount of water, then add the bis-phenol to the aqueous solution, heat to 40° C. to 60° C. and then add the epichlorohydrin and heat to gentle reflux.

As indicated above, the salt contaminant formed in the reaction is preferably removed by use of solvents which are either added at the beginning of the process or during the working up of the resin. The more preferred method is to use the solvent during the purification of the formed resin. Solvents used, for this purpose may be any solvent which is relatively immiscible with brine solutions and dissolves but does not react with the resin. Examples of such solvents include, among other, methyl isobutyl ketone, toluene, diisobutyl ketone, benzene, ethylbenzene and the like, and mixtures thereof.

In working up the resin, the solvent may be added before or after the removal of the aqueous mother liquor phase, but is preferably added after the removal of the aqueous mother liquor phase. The amount of solvent added should be sufficient to form a mobile organic liquid phase with the resin and in most cases the solvent and resin are preferably utilized so as to form solutions having a solid content of about 20% to 80%.

After the resin has been taken up in the solvent, the organic phase is then water washed to remove any entrained salt. One washing may be sufficient, but it is usually desirable to employ two or more washings to ensure satisfactory removal of the salt. It may also be desirable to add agents such as acetic acid or sodium di- or monohydrogen phosphate to the water wash to neutralize any unreacted hydroxide.

After the addition of water wash, the mixture is then merely allowed to stand for a short period until the two distinct layers are formed. As indicated above, the addition of the special additive brings a very rapid and complete separation of the two phases. Increased temperatures may be used to hasten separation, but this step is generally not needed when operating according to the present process.

After formation of the two phases, the water phase is discarded and the organic phase treated to remove the solvent and any entrained water. This may be accomplished by distillation or other suitable means. If distillation is utilized, it is preferably accomplished in two parts. The first part is distillation at mild temperatures and reduced pressure, and the second part is distillation at higher temperatures and high vacuum.

The less preferred method of utilizing the solvents is to add them at the beginning of the reaction. In this case the solvent must not chemically combine with the reactants or product, must have good solvency for all of the reactants and resin and must be substantially immiscible with aqueous brine solution. This includes a very restricted group of solvents comprising the secondary alkanols such as isopropyl alcohol, secondary butyl alcohol, methyl isobutyl carbinol and isohexyl alcohol. The amount of alcohol used in the reaction mixture may vary widely depending upon the alcohol used and epoxy resin being produced. In general, there is used about 10% to 50% by weight of that of the epichlorohydrin employed.

Although various procedures may be employed in utilizing the solvent in the reaction, it is generally preferred to dissolve the polyhydric phenol and epichlorohydrin in the alcohol and then add the hydroxide to this solution. The reaction is then conducted as described above without the addition of the solvent.

At the end of the reaction, the aqueous phase and organic phase are then separated and the organic phase washed with water. In some cases it is desirable to employ dilute aqueous solutions of weak acids, such as acetic acid or sodium di- or monohydrogen phosphate as in the previous case, to neutralize any unreacted hydroxide that may be present. The formation of the two phases, separation and removal of solvent are then accomplished as described above in the case where the solvent is added only during purification of the resin.

To illustrate the manner in which the invention may be carried out, the following examples are given. It is to be understood, however, that the examples are for the purpose of illustration and the invention is not to be regarded as limited to any of the specific conditions or materials recited therein.

Unless otherwise indicated, parts disclosed in the examples are parts by weight.

Example I

This example illustrates the improved phase separation obtained by using sodium hydrosulfite as the additive and adding the solvent during the purification step.

283.3 parts of water was added to a reaction vessel equipped with heater, stirrer, thermometer well and condenser. 32.8 parts of sodium hydroxide and .13 part of sodium hydrosulfite ($Na_2S_2O_4$) were dissolved in the water and then 128.2 parts of bis-phenol added. The reaction mixture was then heated to 55° C. and 64.8 parts of epichlorohydrin added all at once. The mixture was then held at gentle reflux for an hour. Resin began to form in the mixture within about 3 minutes of the addition of the epichlorohydrin. At the end of the reaction period, the aqueous mother liquor was decanted and the remaining resin dissolved in methyl isobutyl ketone so as to form a solution having a solid content of about 60%. This organic mixture was then mixed with 200 parts of a 25% aqueous sodium dihydrogen phosphate solution and the mixture allowed to stand. In a few minutes the mixture had separated into two distinct phases. The aqueous phase was removed and the organic phase again washed with water. In this case also the mixture readily separated into two distinct phases. The aqueous phase was removed and the organic phase flash distilled to remove the methyl isobutyl ketone. The resulting product was an almost water white solid resin having the following properties: melting point (Durrans' mercury method) 98.5° C.; color, Gardner (40% in butylcarbitol <1; viscosity, Gardner-Holdt (40% in butyl carbitol)-V-W; hydroxyl value, 0.297 eq./100; epoxy value, 0.108 mole/100 g.; and molecular weight (ebul. dichloroethane) 1770.

The above process was repeated with the exception that no sodium hydrosulfite was added. In this case, there was very slow and incomplete separation of the two phases and the resulting resin was colored and had a Gardner color of 5.

The resin prepared by using the sodium hydrosulfite not only possessed water white color on purification but gave finished products having excellent light stability. A white enamel formed by baking the resin with urea-formaldehyde resin, for example, had much better resistance to discoloration on exposure to ultraviolet light for 500 hrs. in a fadometer than did a similar enamel containing the resin prepared in the absence of the sodium hydrosulfite.

Example II

This example illustrates the improved phase separation obtained by using sodium hypophosphite

($NaHPO_2 \cdot H_2O$)

as the additive and adding the solvent during the purification step.

566.6 parts of water was added to the reaction vessel described in Example I. 65.7 parts of sodium hydroxide and 2.56 parts of sodium hypophosphite were dissolved in the water and then 256.3 parts of bis-phenol added.

The reaction mixture was then heated to 55° C. and 129.7 parts of epichlorohydrin added all at once. The mixture was then held at gentle reflux for an hour. Resin began to form in the mixture within about 3 minutes after the addition of the epichlorohydrin. At the end of the reaction period, the aqueous mother liquor was decanted and the remaining resin dissolved in methyl isobutyl ketone so as to form a solution having a solid contents of about 60%. This organic mixture was then mixed with 200 parts of a 25% aqueous sodium dihydrogen phosphate solution and the mixture allowed to stand. In a few minutes the mixture had separated into two distinct phases. The aqueous phase was removed and the organic phase again washed with water. In this case also the mixture readily separated into two distinct phases. The aqueous phase was removed and the organic phase flash distilled to remove the methyl isobutyl ketone. The resulting product was a light colored solid resin having the following properties: melting point (Durrans mercury method) 90.2° C.; color, Gardner 3; viscosity, Gardner-Holdt—K; epoxy value 0.118 mole/100 g.; hydroxyl value 0.289 eq./100 g.

The above process was repeated with the exception that no sodium hypophosphite was added. In this case, there was very slow and incomplete separation of the two phases and the resulting resin was colored and had a Gardner color of 5.

Example III

This example illustrates the use of a small amount of sodium hydrosulfite in making a different grade epoxy resin.

75 parts of a 10% aqueous solution of sodium hydroxide and .114 part of sodium hydrosulfite are added to the reaction vessel described in Example I. 228 parts of bis-phenol are then added and the mixture heated to 55° C. 145 parts of epichlorohydrin are then added rapidly with stirring. The temperature of the mixture is then gradually increased and maintained at 95° C. for about 80 minutes. Resin begins to form in the mixture soon after the addition of the epichlorohydrin. At the end of the reaction period, the aqueous mother liquor is decanted and the remaining resin dissolved in methyl isobutyl ketone. This organic mixture is then mixed with 200 parts of a 25% aqueous sodium dihydrogen phosphate solution and the mixture allowed to stand. In a few minutes, the mixture has separated into two distinct phases. The aqueous phase is removed and the organic phase again washed with water. In this case also the mixture readily separates into two distinct phases. The aqueous phase is removed and the organic phase flash distilled to remove the methyl isobutyl ketone. The resulting product is a light colored solid resin having a softening point of about 70° C. and a molecular weight of 900.

The above process is repeated with the exception that no sodium hydrosulfite is added. In this case, there is very slow and incomplete separation of the two phases and the resulting resin is dark brown.

Example IV

To a reaction vessel fitted with a heater, stirrer and condenser, 1009 parts of secondary butyl alcohol, 191 parts of epichlorohydrin, 300 parts of bis-phenol and .3 parts of sodium hydrosulfite were added. The solution was heated with stirring to about 50° C. and then 90.9 parts of sodium hydroxide as a 20% aqueous solution was added. The temperature was increased so that the stirred mixture boiled and refluxing occurred in 30 minutes, and the refluxing was continued for another 30 minutes. At the end of this time, the stirring was discontinued and the mixture readily separated into two distinct phases. The aqueous phase was withdrawn, and the upper organic layer was mixed and neutralized with 25 parts of sodium dihydrogen phosphate as a 25% aqueous solution. The mixture was allowed to stand and in a few minutes separated into two distinct phases. The aqueous layer was removed and the solvent layer dehydrated by flash distillation of the alcohol-water azeotrope, followed by filtering to remove any salt and then distilled to remove the remaining alcohol. The resulting resin was substantially colorless and had an epoxide equivalent weight of 470 and a Durrans' mercury method melting point of 68° C.

When the above process was repeated without the sodium hydrosulfite, the separation of the aqueous and organic phase was relatively slow and incomplete.

*Example V*

To the reaction vessel described in the preceding example was added 808 parts of secondary butyl alcohol, 196 parts of epichlorohydrin, 300 parts of bis-phenol and .3 part of sodium hypophosphite. The solution was heated with stirring to about 50° C. and then 94 parts of sodium hydroxide as a 20% aqueous solution was added. The temperature was then increased so that the stirred mixture boiled and refluxing occurred in about 30 minutes and the refluxing was continued for another 30 minutes. At the end of this time, the stirring was discontinued and the mixture readily separated into two distinct phases. The aqueous phase was withdrawn, and the upper organic phase was mixed and neutralized with 25 parts of sodium dihydrogen phosphate as a 25% aqueous solution. The mixture was allowed to stand and again readily separated into two distinct phases. The aqueous layer was removed and the solvent layer dehydrated by flash distillation of the alcohol-water, azeotrope, followed by filtering to remove any salt and then distilled to remove alcohol. The resulting product was a light colored resin having an epoxide equivalent weight of 949 and a Durrans melting point of 103° C.

*Example VI*

To the reaction vessel described in the preceding example was added 403 parts of methyl isobutyl carbinol, 196 parts of epichlorohydrin and 300 parts of bis-phenol and .3 part of sodium hydrosulfite. The solution was warmed to 50° C. and then 94 parts of sodium hydroxide added as 20% aqueous solution. The mixture was agitated and maintained at reflux temperature for about 1 hour. The mixture was then allowed to stand and readily separated into two distinct phases. The organic layer was then mixed and agitated with 25 parts of sodium dihydrogen phosphate (25% aqueous solution). The mixture was allowed to stand and again readily separated into two distinct phases. The organic layer was next washed with water and then subjected to distillation for removal of small amount of water and alcohol. The resulting resin was substantially colorless and had an epoxide weight of 514 and a Durrans melting point of 72° C.

I claim as my invention:

1. In a process for preparing resinous glycidyl ethers of polyhydric phenols by reacting a polyhydric phenol with an epihalohydrin and an alkali metal hydroxide, the improvement which comprises effecting the reaction in the presence of an alkali metal salt of an inorganic acid selected from the group consisting of hyposulfurous, hypophosphorous and thiosulfuric acids, said alkali metal salt being present in a substantial amount up to 2% by weight of the phenol.

2. In a process for preparing resinous glycidyl ethers of polyhydric phenols by reacting a polyhydric phenol with epichlorohydrin and an alkali metal hydroxide, the improvement which comprises effecting the reaction in the presence of sodium hydrosulfite, said hydrosulfite being present in a substantial amount up to .3% by weight of the phenol.

3. A process for the production of resinous glycidyl ethers of polyhydric phenols which comprises mixing and reacting a mole of a dihydric phenol with an alkali metal hydroxide and more than a mole of epichlorohydrin in the presence of an additive consisting of an alkali metal salt of an inorganic acid selected from the group consisting of hyposulfurous, hypophosphorous and thiosulfuric acids, said alkali metal salt being present in a substantial amount up to 2% by weight of the phenol.

4. A process as in claim 3 wherein the additive is a hypophosphite of an alkali metal.

5. A process as in claim 3 wherein the additive is a hydrosulfite of an alkali metal.

6. A process as in claim 3 wherein the phenol is 2,2-bis(4-hydroxyphenyl) propane.

7. A process as in claim 3 wherein the alkali metal hydroxide is sodium hydroxide.

8. A process for the production of a resinous glycidyl ether of 2,2-bis(4-hydroxyphenyl) propane which comprises mixing and reacting a mole of the 2,2-bis(4-hydroxyphenyl) propane with more than one mole but not more than 20 moles of epichlorohydrin and with sodium hydroxide in an amount which is about 2 to 30% excess over the stoichiometric equivalent of the epichlorohydrin in the presence of sodium hydrosulfite, the mixture being agitated and heated in the liquid phase at a temperature between 50° C. and 150° C. to effect the etherification reaction, said sodium hydrosulfite being present in a substantial amount up to 0.3% by weight of the phenol.

9. A process for the production of glycidyl ether of a dihydric phenol which comprises mixing an alkali metal hydroxide as about 5% to 30% by weight aqueous solution and an alkali metal salt of an inorganic acid selected from the group consisting of hyposulfurous, hypophosphorous and thiosulfuric acids, to a mixture containing a mole of dihydric phenol and from 1.05 to 20 mole of epichlorohydrin while heating and agitating the reaction mixture within the range of about 50° C. to boiling temperature so as to thereby effect the etherification reaction, the hydroxide being added in amount of about 2 to 30% excess over the stoichiometric equivalent of the epichlorohydrin the said alkali metal salt being present in a substantial amount to 2% by weight based on the weight of the phenol; next removing the resulting resin and dissolving it in a liquid organic solvent which is relatively immiscible with aqueous brine solution and is inert to the glycidyl ethers, washing the resulting organic solution with water, allowing the mixture to stratify, removing the aqueous layer and then recovering the glycidyl ether from the organic phase.

10. A process as in claim 9 wherein the dihydric phenol is 2,2-bis(4-hydroxyphenyl) propane and the metal salt is sodium hydrosulfite.

11. A process for the production of an epoxy resin which comprises mixing an alkali metal hydroxide as about a 5% to 30% by weight aqueous solution and an alkali metal salt of an inorganic acid selected from the group consisting of hyposulfurous, hypophosphorous and thiosulfuric acids, to a solution containing a mole of dihydric phenol, about 1.05 to 20 moles of epichlorohydrin and an amount of a secondary alkanol of 3 to 8 carbon atoms equal to about 50% to 400% by weight of the epichlorohydrin while heating and agitating the reaction mixture within the range of from about 40° C. to boiling temperature so as to thereby effect the etherification reaction, the hydroxide being added in amount of about 2% to 30% excess over the stoichiometric equivalent of the epichlorohydrin the said alkali metal salt being present in a substantial amount to 2% by weight based on the weight of the phenol; next allowing the reaction mixture to stratify into an aqueous phase and an organic phase, separating the two phase and washing the organic phase, and then treating the organic phase so as to recover the epoxy resin therefrom.

12. A process as in claim 11 wherein the dihydric phenol is 2,2-bis(4-hydroxyphenyl) propane and the metal salt is sodium hydrosulfite.

References Cited in the file of this patent

UNITED STATES PATENTS

| | | |
|---|---|---|
| 2,072,825 | Reppe et al. | Mar. 2, 1937 |
| 2,686,771 | Whitehill et al. | Aug. 17, 1954 |
| 2,738,339 | Taylor et al. | Mar. 13, 1956 |

OTHER REFERENCES

"Hackh's Chemical Dictionary," 2nd ed., page 471.
Partington: "Textbook of Inorganic Chemistry," 6th ed., MacMillin & Co., London, 1950, pages 491 and 590.